United States Patent Office 3,441,752
Patented Apr. 29, 1969

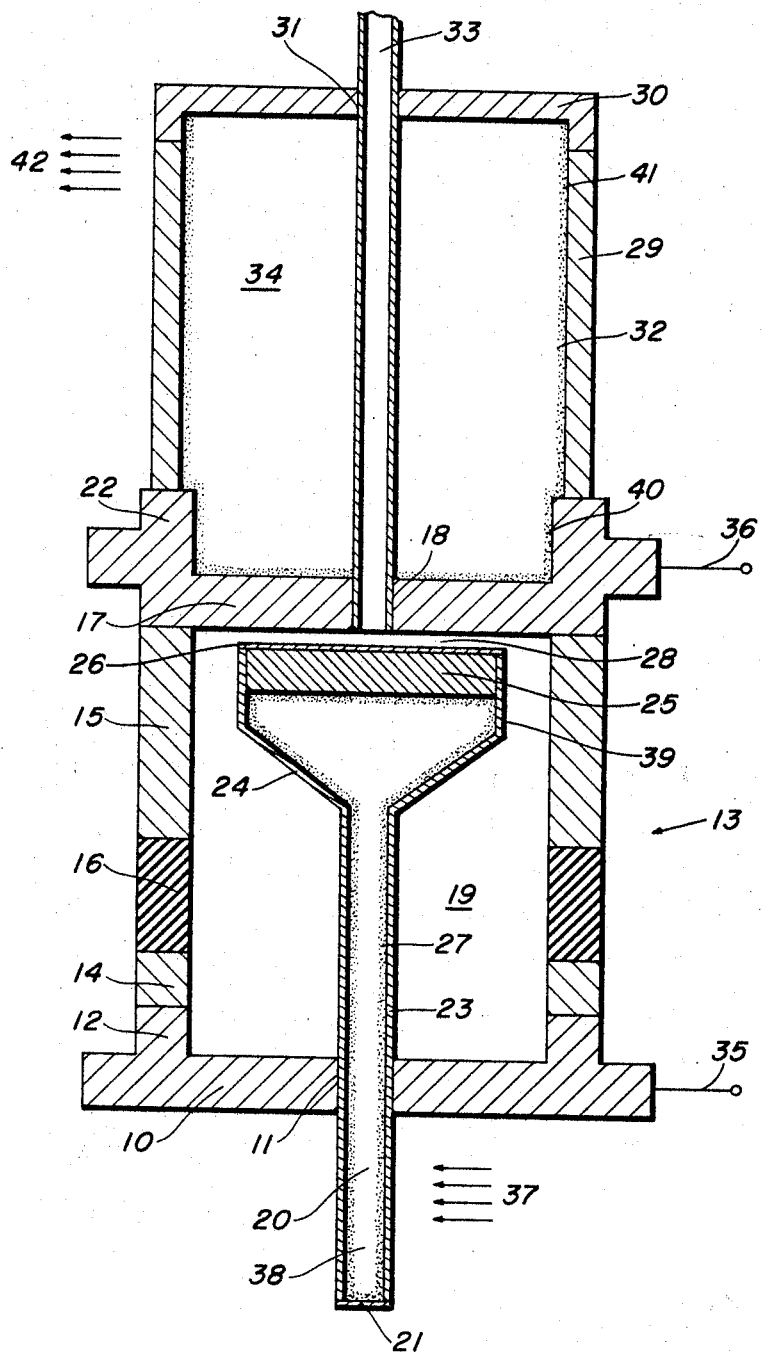

3,441,752
THERMIONIC CONVERTER DEVICE
George M. Grover, Los Alamos, N. Mex., Claus A. Busse, Laveno, and René Jean Coron, Ispra, Italy, assignors, by direct and mesne assignments, to the United States of America as represented by the United States Atomic Energy Commission
Filed Oct. 23, 1965, Ser. No. 504,269
Claims priority, application Germany, Dec. 14, 1964,
E 28,353
Int. Cl. H02n 3/00
U.S. Cl. 310—4
4 Claims

ABSTRACT OF THE DISCLOSURE

A thermionic converter or directly converting heat into electrical energy comprising an emitter, a collector, a first heat pipe for transferring heat from a heat source to the emitter surface, a second heat pipe for transferring heat away from the collector surface to a heat sink, tubular means for introducing an easily ionizable gas into the space between the emitter and collector and means enclosing the aforementioned elements.

---

Thermionic converters are comprised of a heated emitter electrode and a cooled collector electrode, both electrodes being enclosed in a vacuum tight vessel containing cesium vapor. In order to obtain a reasonable efficiency in the energy conversion process, the emitter temperature must be brought to at least 1600° C. to 1800° C. One of the most difficult technological problems in the thermionic converter art is to keep constant an extremely small distance between the emitter and collector electrode during operation. Another serious problem is the removal of heat from the collector. A further problem in the case of a thermionic converter is that the heated portions of the emitter electrode operate at a much higher temperature than the electron emitting layer on the surface of the electrode. Furthermore, the temperature distribution along the emitter surface is not uniform but irregular, that is to say, that the temperature decreases towards the periphery. In summary, the prevailing temperature gradient in existing converters constitutes the major barrier for any effective power conversion. Therefore it can be seen that variations in the heat source such as intensity and geometric form influence the emitter electrode to an appreciable degree. This is particularly true in the case of converters in which the emitter electrode is heated by nuclear fuel, that is to say, heat resulting from nuclear fission.

As to heating the emitter electrode, heat from an external source can be introduced to a heat consuming element only by tolerating a considerable temperature drop. The same is true for heat extraction from a collector, as a considerable drop in temperature occurs between the hottest spot of an element and the region where the heat is extracted.

A recent invention of the "Heat Pipe," described in Grover, Cotter, and Erickson, Structures of Very High Thermal Conductance, 35 Journal of Applied Physics 1990 (June 1964), and in Grover Patent No. 3,229,759 is applied to overcome the above-mentioned difficulties. A "heat pipe" is a heat transfer device comprising a container, condensable vapor and capillary means disposed within the container capable of causing the transport of the condensed vapor from a cooler area of the container to a hotter area. This device is hereafter termed a "heat pipe". The transport of the vapor through the container uses, as the driving force, the difference in vapor pressures in the high temperature zone and the cold temeprature zone. The liquid which condenses in the cold zone is returned to the evaporation zone by capillary action. Thus fluid circulation is established in the pipe with the non-heated end of the pipe acting as a condenser. By means of this circulation, a heat flux is created to flow from the heated end of the pipe to the pipe's nonheated end. The temperature drop along the heat pipe is powers of ten lower than in the case of conventional heat transports. Accordingly, a uniform temperature distribution is established along the entire pipe surface.

Furthermore, heat pipes can be used as a heat density transformer, as they transfer heat from a distributed, that is to say, from an etxended and irregular intense heat source to a localized, concentrated heat sink.

Accordingly, it is an object of the present invention to provide a thermionic converter wherein the temperature at the emitter surface is practically identical with the temperature of the heat source which is heating the emitter surface.

It is another object to provide a thermionic converter wherein the entire emitter surface is at a uniform temperature.

It is another object to provide a thermionic converter whereby the heat transfer and the extraction of the wasted heat can be easily adapted to the particularities and specifics of the heat source such as intensity, locality, and geometry of the heat source and the heat sink.

It is another object to provide a thermionic converter wherein no separate coolant is necessary or pumps necessary to circulate the coolant.

It is another object to provide a thermionic converter which is operable under gravity free condition.

It is a further object to construct thermionic converters with closely spaced emitter and collector electrodes since warping of the electrodes is eliminated as a result of the absence of thermal gradients.

The present invention is a thermionic converter wherein heat pipes are connected directly to the emitter and collector electrodes. In one embodiment of the present invention, the front faces of the heat pipes are used directly as emitter and collector electrodes respectively.

Various other objects and advantages will appear from the description of the following embodiment of the invention, and the novel features will be pointed out hereinafter in connection with the appended claims.

The invention will be clearly understood by reference to the accompanying sheet of drawings wherein:

The figure is a longitudinal cross section of an apparatus suitable for carrying out the present invention.

In the illustrated embodiment of the invention, an electrically conducting base 10 having electric connection 35 and an aperture 11 is formed with a raised integral tubular portion 12.

Raised tubular portion 12 of base 10 carries a housing 13 comprised of a first tubular member 14 and a second tubular member 15 separated by a tubular electrical insulator 16 of ceramic material such as Al₃O₃. Tubular member 14 of housing 13 is secured to portion 12 of base 10 by means apparent to those skilled in the art such as by welding. First and second tubular members 14 and 15 are secured to ceramic insulator 16 by means apparent to those skilled in the art such as metal to ceramic sealing. The second tubular member 15 of housing 13 carries a circular shaped collector electrode 17 having an aperture 18 and electrical connection 36. Collector electrode 17, formed with an integral tubular sleeve 22 defines a chamber 19 formed by base 10; integral raised tubular portion 12; tubular member 14, 15 and 16; and collector electrode 17. Collector electrode 17 is preferably formed of niobium-zirconium alloy Nb-1 Zr.

Disposed in chamber 19 and passing through aperture 11 in base 10 is a heat pipe 20. Heat pipe 20 consists of a thimbled section 23 which passes through and is secured in aperture 11 by means such as welding. External to chamber 19, thimbled section 23 of heat pipe 20 is provided with a closure member 21. Within chamber 19, thimbled section 23 of heat pipe 20 is flared out to form bulb-like portion 24. Thimbled section 23, closure member 21 and the bulb-like portion 24 of heat pipe 20 are preferably formed of tantalum-tungsten alloy Ta-10W. Secured to bulb-like portion 24 of heat pipe 20 is an emitter electrode 25 formed into a circular shaped plate which serves directly as an end cap for heat pipe 20. Emitter electrode 25 is preferably formed of tantalum-tungsten alloy Ta-10W and carries a vapor plated layer 26 of rhenium as the electron emitting material. Heat pipe 20, carrying emitter electrode 25 is spaced from collector 17 so as to define a gap 28 between electron emitting layer 26 and collector 17. Emitter electrode 25 and closure 21 are secured to bulb-like portion 24 and thimbled section 23 respectively, by welding. The inner walls of heat pipe 20 are covered with a wick of suitable capillary structure shown at 27. It is a requirement that the pore size be sufficiently small to produce capillary action and that the material utilized be compatible at the condition of operation. The carrier fluid in heat pipe 20 is preferably silver.

Carried and secured to the integral sleeve 22 of collector electrode 17 is the tubular collector heat pipe 29. The end of heat pipe 29 distal to collector 17 is capped by closure 30 provided with an aperture 31. Heat pipe 29 and closure 30 are preferably formed of niobium-zirconium alloy Nb-1 Zr and secured together by welding. The inner walls of heat pipe 29 and tubular sleeve 22, of collector electrode 17 are covered with a wick of suitable capillary structure shown at 32. It is a requirement that the pore size be sufficiently small to produce capillary action and that the material utilized be compatible at the conditions of operation. The carrier fluid in collector heat pipe 29 is lithium.

A duct 33 is disposed and welded in aperture 18 of collector 17 and aperture 31 of closure 30 so as to extend externally from chamber 34 defined by collector electrode 17, tubular sleeve 22, collector heat pipe 29, and closure 30.

In operation, duct 33 is connected to a cesium source (not shown) so as to conduct cesium via duct 33 to chamber 19. Heat designated by arrows 37 is applied to heat pipe 20 external to chamber by a heat source not shown. Examples of a heat source would be a naked flame, an electrical induction coil, a nuclear fuel element, nuclear or solar radiation, a heat carrying fluid, etc. After the heat represented by narrows 37 is applied, the silver within heat pipe 20 becomes liquified and saturates wick 27. The liquid silver in evaporator region 38 vaporizes under the application of heat represented by arrows 37. Due to the difference in liquid temperature between the evaporator region 38 and condenser region 39, the resulting difference in pressure in vapor drives the vapor from the evaporator region 38 to condenser region 39. The vapor arrives at condenser region 39 wherein emitter electrode 25 acts as a heat sink so as to condense the vapor to a liquid, filling the pores of the wick and increasing the radius of curvature of the liquid surface in the wick. In the evaporator section 38, the evaporation or liquid from the pores of the wick causes a reduction of the radius of curvature of the liquid surface, as the liquid is evaporated from the pores, to a limit of the radius of curvature of the pores in the wick. As described in the reference on "heat pipes" by Grover, Cotter and Erickson, the pressure in the liquid is reduced in proportion to the radius of curvature of the liquid surface. Therefore the pressure in the liquid is reduced proportionally more in the evaporator section of the wick than in the condenser section of the wick. The pressure differential drives the liquid through the wick 27 from the condenser region 39 to the evaporator region 38 against the various retrading forces.

Emitter electrode 25 heated by heat pipe 20 in turn heats electron emitting material 26. The electrons emitted from material 26 flow across interelectrode gap 28, which contains cesium vapor for space charge neutralization, to collector 17 then through electrical connection 36 to an external load (not shown) and to the return path provided by electrical connection 35.

The electron flow from the emitter to the collector is primarily dependent upon the absolute temperature of the emitter and secondarily on the thermal gradient between the hot emitter and the "cold" collector. By employing silver as the heat carrier fluid within emitter heat pipe 20, a temperature of 1600° to 1800° C. is achieved at the emitter electrode.

In order to provide a substantial temperature differential between the hot emitter and cold collector as all thermionic converters require, the heat generated by the electrons impinging upon collector 17 must be removed from collector 17. Upon heating of collector 17 having an integral tubular sleeve 22 both of which define an evaporator region 40, the lithium within collector heat pipe 29 becomes liquified and saturates wick 32. The liquid temperature in the evaporator of region 40 of collector heat pipe 29 is slightly higher than the collector heat pipe condenser region designated by the FIGURE 41. The liquid lithium in the evaporator region 40 vaporizes. Due to the difference in liquid temperature between the collector heat pipe evaporator region 40 and condenser region 41, the resulting difference in pressure drives the lithium vapor from evaporator region 40 to collector region 41. The vapor upon arriving at collector heat pipe condenser region 41 transfers heat which is designated by arrows 42 to a heat sink (not shown). A suitable heat sink is apparent to those skilled in the art which may be in the form of a heat exchanger or in the case of dissipating heat in space, the free end of the collector heat pipe 29 acts directly as a radiator. Upon transfer of heat to a heat sink, the vapor condenses at region 41 of heat pipe 29 and creates a pressure differential in the liquid with respect to the evaporator region 40 due to the difference in the radii of curvature of the liquid surfaces. The pressure differential drives the liquid through the wick 32 from heat pipe condenser region 41 to the evaporator region 40 against the various retarding forces. Thus the collector operates at a temperature between 800° and 1000° C.

In that thermionic converters require a substantial temperature differential between the hot emitter and the cold collector, it is seen that the remarkable heat transfer rate with very small temperature gradient associated with the heat pipe permits the efficient operation of this device.

In the specific embodiment, the diameters of the emitter heat pipe 20 are 10 mm. O.D. and 8 mm. I.D., and those of collector heat pipe 29 are 40 mm. O.D. and 38 mm. I.D. The diameter of the collector electrode 17 is 30 mm. The sizes of the heat receiving or the heat emitting portions of the heat pipes can be conveniently adapted to the temperature conditions required at the electrodes. This is carried out simply in that longer or shorter portions of the heat pipes are thermally coupled to the heat source and to the heat sink respectively.

It will be understood that various changes in the details, materials, steps and arrangements of parts, which have herein been described and illustrated in order to explain the nature of the invention may be made by those skilled in the art within the principle and scope of the invention as expressed in the appended claims.

What is claimed is:

1. A thermionic converter comprising:
    (a) a collector;
    (b) an emitter spaced from said collector and electrically insulated therefrom;

(c) a chamber enclosing the space between said emitter and collector and containing an easily ionizable gas;

(d) first heat transfer means for cooling said collector and ionizing said gas including a collector container, said collector container enclosing a first condensable vapor and having capillary means capable of transporting condensed said first condensable vapor to said collector;

(e) second heat transfer means for heating said emitter including an emitter container, said emitter container enclosing a second condensable vapor and having capillary means capable of transporting condensed said second condensable vapor away from said emitter.

2. A thermionic converter comprising:

(a) a first container enclosing a first condensable vapor;

(b) an electron emitting end of said first container;

(c) a second end of said first container opposite said electron emitting end;

(d) capillary means on the inner surface of said first container for transporting condensed said first condensable vapor from said electron emitting end to said second end of said first container;

(e) a second container electrically insulated from said first container enclosing a second condensable vapor;

(f) an electron collecting end of said second container spaced from said electron emitting end of said first container;

(g) a second end of said second container opposite said electron collecting end;

(h) capillary means on the inner surface of said second container for transporting condensed said second condensable vapor from said electron collecting end to said second end of said second container;

(i) a third container enclosing the space between said emitter end of said first container and said collector end of said second container and containing an easily ionizable gas.

3. A thermionic converter according to claim 2 wherein said electron emitting end of said first container carries a vapor plated layer of rhenium.

4. A thermionic converter comprising:

(a) an evacuated envelope including:
  (1) an electrically conducting base having an aperture
  (2) a first tubular member secured to said base;
  (3) electrical insulating means secured to said first tubular member;
  (4) a second tubular member secured to said electrical insulating means;
  (5) an electron collector having an aperture, said collector secured to said second tubular member;

(b) a first sealed tube passing through the aperture in said base, said first tube enclosing a first condensable vapor, the first end of said first tube external said evacuated envelope, and the second end of said first tube disposed within said evacuated envelope;

(c) an electron emitter attached to said second end of said first tube, said electron emitter spaced from said collector, and carrying a layer of rhenium;

(d) capillary means covering the inner surface of said first tube capable of transferring condensed said first condensable vapor from said first end of said first tube to said second end of said first tube;

(e) a second envelope containing a second condensable vapor including:
  (1) said collector comprising the first end of said second envelope;
  (2) a third tubular member secured to said collector;
  (3) a closure secured to said third tubular member comprising the second end of said second envelope, said closure having an aperture;

(f) capillary means convering the inner surface of said second envelope capable of transferring condensed said second condensable vapor from said first end of said second envelope to said second end of said second envelope;

(g) a second tube disposed in the aperture of said closure of said second envelope and in the aperture of said collector for introducing cesium to the space between said emitter and said collector.

References Cited

UNITED STATES PATENTS

| | | | |
|---|---|---|---|
| 2,881,384 | 4/1959 | Durant | 322—2 |
| 3,229,759 | 1/1966 | Grover | 62—487 XR |
| 3,243,613 | 3/1966 | Grover | 310—4 |
| 3,330,974 | 7/1967 | Wilson | 310—4 |
| 3,302,042 | 1/1967 | Grover et al. | 310—4 |

J. D. MILLER, *Primary Examiner.*

D. F. DUGGAN, *Assistant Examiner.*